US012722317B1

(12) United States Patent
Sun

(10) Patent No.: US 12,722,317 B1
(45) Date of Patent: Sep. 1, 2026

(54) FOOD CUTTING APPARATUS

(71) Applicant: Shenzhen Kitchen Creation Technology Co., Ltd., Shenzhen (CN)

(72) Inventor: Wei Sun, Shenzhen (CN)

(73) Assignee: Shenzhen Kitchen Creation Technology Co., Ltd., Shenzhen (CN)

(*) Notice: Subject to any disclaimer, the term of this patent is extended or adjusted under 35 U.S.C. 154(b) by 0 days.

(21) Appl. No.: 19/412,843

(22) Filed: Dec. 8, 2025

(30) Foreign Application Priority Data

Jun. 23, 2025 (CN) ........................ 202521298898.5

(51) Int. Cl.
*B26B 29/00* (2006.01)
*B26B 29/06* (2006.01)

(52) U.S. Cl.
CPC ...... *B26B 29/063* (2013.01); *B26B 2029/066* (2013.01)

(58) Field of Classification Search
CPC ........................ B26B 29/063; B26B 2029/066
See application file for complete search history.

(56) References Cited

U.S. PATENT DOCUMENTS

| | | | | | |
|---|---|---|---|---|---|
| 2,398,192 | A * | 4/1946 | Scheminger, Jr. | B26B 29/063 | D7/673 |
| 4,051,758 | A * | 10/1977 | Livick | B26B 29/063 | 83/761 |
| 4,133,238 | A * | 1/1979 | Jacobs | B26B 29/063 | 83/762 |
| 4,399,989 | A * | 8/1983 | Baillie | B26B 29/063 | 269/238 |
| 4,964,323 | A * | 10/1990 | Fortney | B26B 29/063 | 83/167 |
| 5,386,755 | A * | 2/1995 | Schneider | B26B 29/063 | D7/673 |
| D362,374 | S * | 9/1995 | Roach | D7/673 | |
| 5,697,276 | A * | 12/1997 | Nassau | B26B 29/063 | 269/291 |
| 7,007,583 | B1 * | 3/2006 | Fiola | B26B 29/063 | 83/870 |
| 9,636,831 | B1 * | 5/2017 | Furia | B26B 29/063 | |
| 10,448,788 | B1 * | 10/2019 | Milhiser | A47J 47/005 | |
| 2018/0085960 | A1 * | 3/2018 | Roberts | B26B 29/063 | |
| 2024/0066736 | A1 * | 2/2024 | Shabazian | B26B 29/063 | |
| 2025/0276464 | A1 * | 9/2025 | Shabazian | B26B 29/063 | |
| 2025/0289155 | A1 * | 9/2025 | Huang | B26B 29/063 | |
| 2026/0008195 | A1 * | 1/2026 | Yu | B26B 29/063 | |

* cited by examiner

*Primary Examiner* — Omar Flores Sanchez

(57) ABSTRACT

A food cutting apparatus in the field of food cutting technology is disclosed, comprising a base, two side walls connected to and disposed opposite each other on the base, and at least two divider plates detachably connected to at least one of the side walls, wherein adjacent divider plates together with the side wall define a first cutting space for a first type of food. The apparatus further comprises a removable side panel detachably connectable to the side wall or the base, with at least the two divider plates arranged on the same side of the removable side panel. Upon removal of the removable side panel and at least one divider plate, an unremoved divider plate cooperates with the side wall to define a second cutting space for a second type of food. This configuration enables a single cutting apparatus to perform cutting operations on multiple types of food.

6 Claims, 5 Drawing Sheets

FOOD CUTTING APPARATUS

TECHNICAL FIELD

The present application relates to the field of food cutting technology, and more specifically, to a food cutting apparatus. This apparatus is designed for manual slicing of various food items, such as bagels and bread, in a household setting.

BACKGROUND OF THE INVENTION

In general, households require a variety of food items in the morning, for example, approximately 80% of households in Europe and the United States prepare multiple types of foods such as bagels and bread. Taking bagels and bread as examples, bagels and bread typically require slicing or sectioning, but existing bagels and bread necessitate separate dedicated sectioning devices, such as bagel slicers, which can simply divide a bagel into two halves but make it difficult to securely hold the bagel for safe operation if the user's fingers are slightly larger, and bread crumbs are prone to remaining inside, making cleaning difficult; whereas bread slicers are typically very bulky in size. Thus, the switching and use of multiple food sectioning devices creates numerous inconveniences for users in terms of operation, cleaning, and storage.

SUMMARY OF THE INVENTION

In view of the foregoing, embodiments of the present application provide a food cutting apparatus employing the following technical solution:

Embodiments of the present application provide a food cutting apparatus, comprising: a base; two side walls connected to the base and disposed opposite each other; and at least two divider plates detachably connected to at least one of the side walls, wherein adjacent ones of the divider plates together with the side wall define a first cutting space for a first type of food; further comprising a removable side panel detachably connected to the side wall or the base; wherein at least the two divider plates are disposed on the same side of the removable side panel; and upon removal of the removable side panel and at least one of the divider plates, an unremoved divider plate together with the side wall defines a second cutting space for a second type of food.

Further, the two side walls respectively define a plurality of first slots along a height direction thereof, and opposite sides of each divider plate are respectively inserted into the first slots of the two side walls to form a detachable connection between the divider plate and the side walls.

Further, the two side walls further define a cutting aperture, and the cutting aperture is located between two adjacent divider plates.

Further, the unremoved divider plate and the removable side panel are respectively located on opposite sides of the cutting aperture.

Further, a first recess is defined on a side of the divider plate facing away from the base, and the first recess is configured to allow a finger to extend through the first recess into a cut first-type food and remove it.

Further, the removable side panel and/or a fixed side panel respectively define a second recess on a side facing away from the base, and the second recess is configured to allow a finger to extend through the second recess into a cut first-type food and remove it when the removable side panel and/or the fixed side panel are located close to the divider plate.

Further, a fixed side panel is further provided on a side of the base opposite the removable side panel.

Further, an outer edge of the side wall defines a second slot along the height direction thereof; a side edge of the removable side panel includes a first protrusion adapted to the second slot; and the removable side panel is inserted into the second slot via the first protrusion to form a detachable connection between the removable side panel and the side wall.

Further, the removable side panel further defines an abutment portion on an outer side of the first protrusion, and the abutment portion is configured to abut and adapt to an end face of an outer wall of the second slot.

Further, a side of the base adjacent the removable side panel is an installation side; a lower end of the removable side panel is provided with a first connection structure; the installation side of the base is provided with a second connection structure configured to releasably engage and adapt to the first connection structure; and after detaching the removable side panel from the second slot, the first connection structure is connected with the second connection structure such that the removable side panel is coplanar with the base and extends in a direction away from the installation side.

Further, one of the first connection structure and the second connection structure is a second protrusion; the other of the first connection structure and the second connection structure is a groove adapted to the second protrusion; and/or the second connection structure is located on a lower surface of the installation side of the base.

Further, at least two of the first slots further define graduation markings, and the graduation markings are correspondingly marked according to distances between the first slots and the cutting aperture.

Further, a surface of the base is provided with a non-slip pad.

Compared with the prior art, embodiments of the present application mainly have the following beneficial effects:

Embodiments of the present application, by employing at least two divider plates detachably connected to the side wall, form a first cutting space for a first type of food between adjacent ones of the divider plates and the side wall, and upon removal of the removable side panel and at least one divider plate, an unremoved divider plate together with the side wall defines a second cutting space for a second type of food; thus, a single food cutting apparatus can integrate sectioning functions for at least two types of food, saving costs and storage space while improving efficiency and quality of life.

Additionally, since the divider plates are detachable, when cleaning is needed, the divider plates can be removed for cleaning, thereby facilitating cleaning of the food cutting apparatus.

BRIEF DESCRIPTION OF DRAWINGS

To more clearly illustrate the solutions of the present application, a brief introduction will now be provided to the drawings required for the description of the embodiments. Obviously, the drawings described below are merely some embodiments of the present application. For those of ordinary skill in the art, other drawings can be obtained based on these drawings without creative effort.

Figure 1:
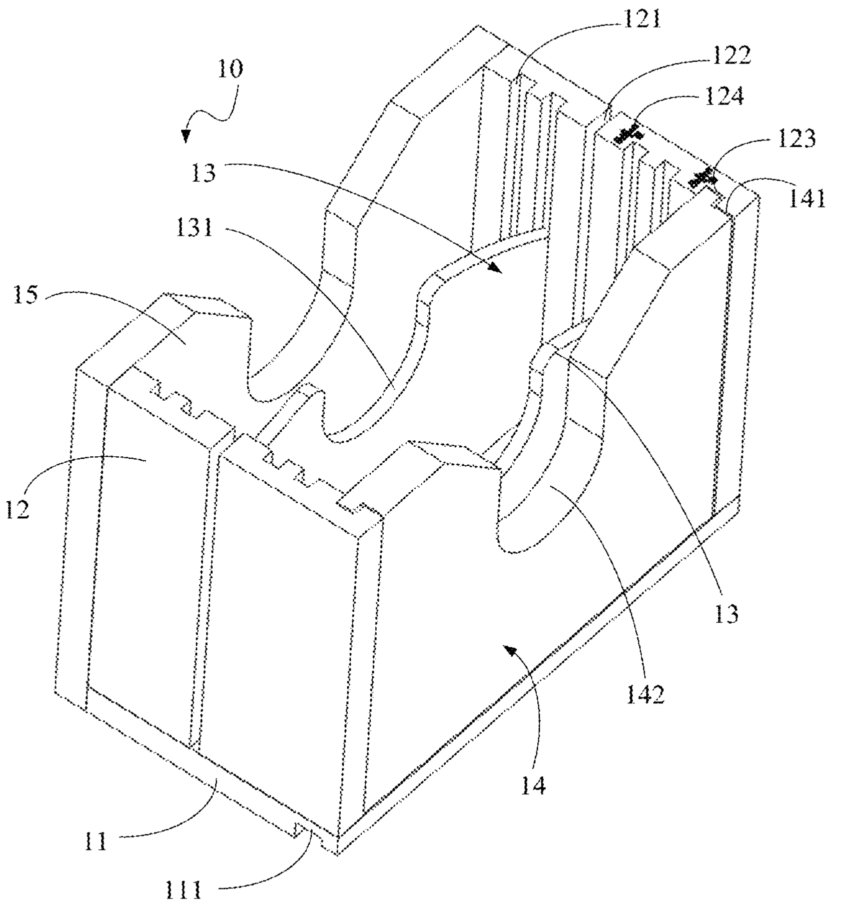
FIG. 1 is a schematic view of the overall structure of the food cutting apparatus provided by an embodiment of the present application in a state of cutting a first type of food.

Reference Numerals: food cutting apparatus (10); base (11); side wall (12); divider plate (13); removable side panel (14); fixed side panel (15); groove (111); first slot (121); cutting aperture (122); second slot (123); graduation markings (124); first recess (131); abutment portion (141); second recess (142); second protrusion (143); first protrusion (144).

DETAILED DESCRIPTION OF THE INVENTION

Unless otherwise defined, all technical and scientific terms used herein have the same meaning as commonly understood by one of ordinary skill in the art to which this application belongs. The terms used in the specification of the present application are for the purpose of describing particular embodiments only and are not intended to limit the present application. The terms "comprising" and "having," and any variations thereof, in the specification and claims of the present application and the description of the drawings above are intended to cover non-exclusive inclusions. The terms "first," "second," and the like in the specification, claims, and description of the drawings of the present application are used to distinguish different objects and are not used to describe a specific order or sequence.

As used herein, reference to an "embodiment" means that a particular feature, structure, or characteristic described in connection with the embodiment is included in at least one embodiment of the present application. The phrase appearing in various places throughout the specification does not necessarily refer to the same embodiment, nor is it an independent or alternative embodiment that is mutually exclusive with other embodiments. It will be understood by those of ordinary skill in the art that the embodiments described herein can be combined with other embodiments, both explicitly and implicitly.

To enable those of ordinary skill in the art to better understand the solutions of the present application, the technical solutions in the embodiments of the present application will now be described clearly and completely with reference to the accompanying drawings.

Figure 2:
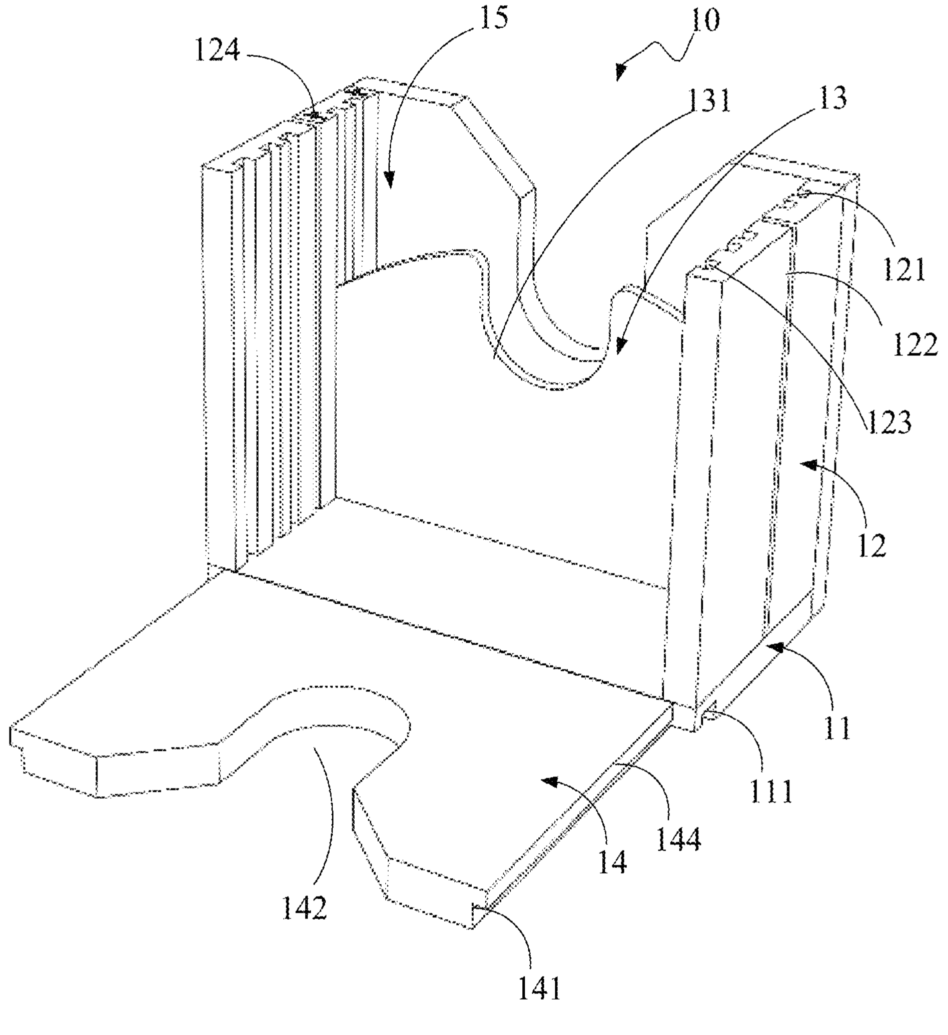
FIG. 2 is a first perspective structural schematic view of the food cutting apparatus provided by an embodiment of the present application in a state of cutting a second type of food.
Figure 3:
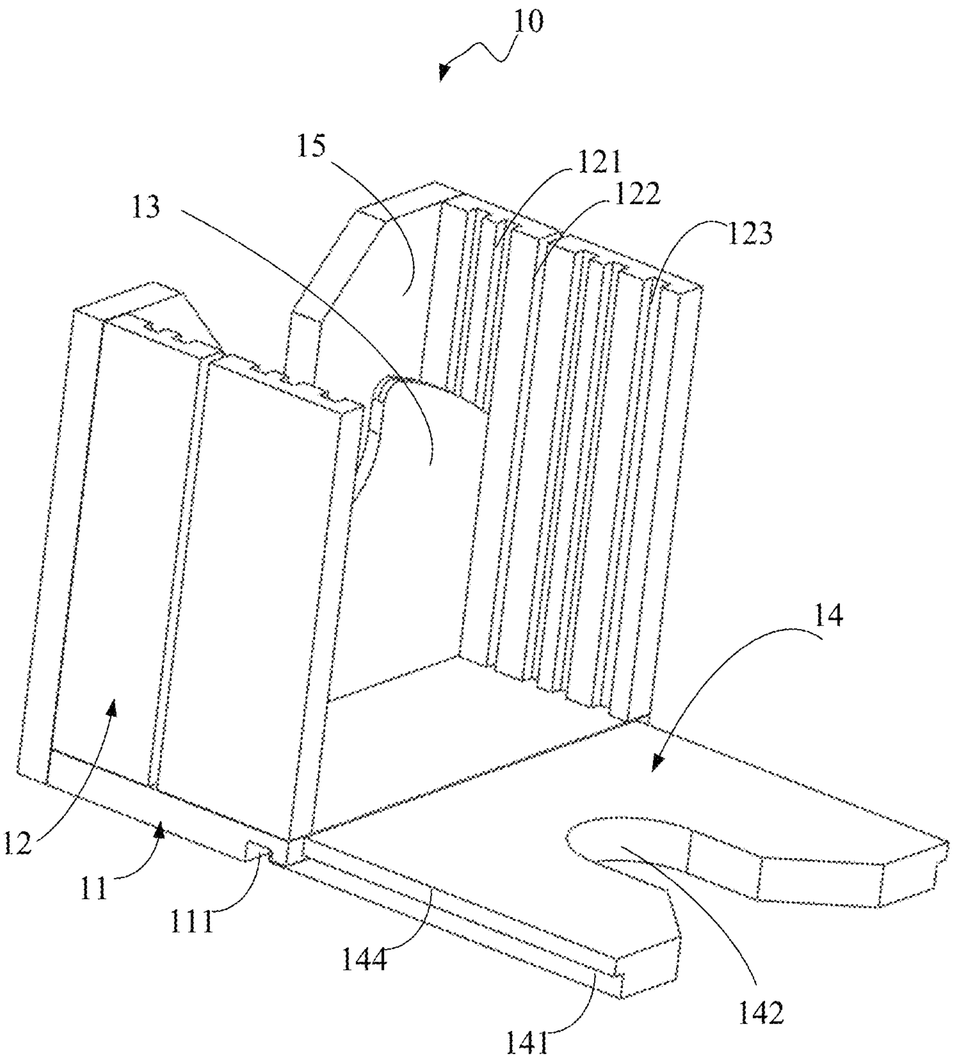
FIG. 3 is a second perspective structural schematic view of the food cutting apparatus provided by an embodiment of the present application in a state of cutting a second type of food.

As shown in FIGS. 1 to 3, FIG. 1 is a schematic view of the overall structure of the food cutting apparatus (10) provided by an embodiment of the present application in a state of cutting a first type of food; FIG. 2 is a first perspective structural schematic view of the food cutting apparatus (10) provided by an embodiment of the present application in a state of cutting a second type of food; and FIG. 3 is a second perspective structural schematic view of the food cutting apparatus (10) provided by an embodiment of the present application in a state of cutting a second type of food.

An embodiment of the present application provides a food cutting apparatus (10), comprising: a base (11); two side walls (12) connected to the base (11) and disposed opposite each other; and at least two divider plates (13) detachably connected to at least one of the side walls (12), wherein adjacent ones of the divider plates (13) together with the side wall (12) define a first cutting space for a first type of food. The food cutting apparatus (10) further comprises a removable side panel (14) detachably connected to the side wall (12) or the base (11); wherein at least the two divider plates (13) are disposed on the same side of the removable side panel (14); and upon removal of the removable side panel (14) and at least one divider plate (13), an unremoved divider plate (13) together with the side wall (12) defines a second cutting space for a second type of food.

Herein, the term "same side" refers to at least the two divider plates (13) being located on the same side of the removable side panel (14), for example, both divider plates (13) being located on the left side of the removable side panel (14). The "first type of food" can be any suitable food as needed, for example, a bagel. The "second type of food" can also be any suitable food as needed, for example, bread. For ease of understanding, the embodiments of the present application will be described in detail primarily taking the first type of food as a bagel and the second type of food as bread as examples.

As shown in FIG. 1, when the two divider plates (13) are mounted to the side wall (12) in the present application, a bagel cutting space is defined between the two divider plates (13), allowing a bagel to be placed vertically in the space formed between the base (11) and the two divider plates (13), and cutting downward from a position corresponding to the middle of the bagel above the two divider plates (13), thereby dividing the bagel into two halves. As shown in FIG. 2, when the removable side panel (14) and at least one divider plate (13) are removed, the unremoved divider plate (13) together with the side wall (12) defines a second cutting space for a second type of food, allowing bread to be placed on the base (11), with one end of the bread abutting the unremoved divider plate (13), and then performing a slicing operation on the bread.

Embodiments of the present application, by employing at least two divider plates (13) detachably connected to the side wall (12), form a first cutting space for a first type of food between adjacent ones of the divider plates (13) and the side wall (12), and upon removal of the removable side panel (14) and at least one divider plate (13), an unremoved divider plate (13) together with the side wall (12) defines a second cutting space for a second type of food; thus, a single food cutting apparatus (10) can integrate sectioning functions for at least two types of food, saving costs and storage space while improving efficiency and quality of life. Additionally, since the divider plates (13) are detachable, when cleaning is needed, the divider plates (13) can be removed for cleaning, thereby facilitating cleaning of the food cutting apparatus (10).

Continuing as shown in FIGS. 1 to 3, in an optional embodiment, the two side walls (12) respectively define a plurality of first slots (121) along a height direction thereof, and opposite sides of each divider plate (13) are respectively inserted into the first slots (121) of the two side walls (12) to form a detachable connection between the divider plate (13) and the side walls (12).

In embodiments of the present application, the side wall (12) includes a side wall bottom face adjacent the base (11) and a side wall top face opposite the side wall bottom face; inserting the divider plate (13) into the first slot (121) from the direction of the side wall top face enables the detachable connection between the divider plate (13) and the side wall (12), allowing quick installation of the divider plate (13) via a simple structure.

It should be noted that, in addition to the detachable structure described in the above embodiments, the detachable structure between the side walls (12) and the divider plates (13) in embodiments of the present application can adopt various existing or future-developed detachable connection structures as needed, such as snap-fit connection structures or hinge connection structures, all of which fall within the scope of protection of the present application.

Continuing as shown in FIGS. 1 to 3, in an optional embodiment, the two side walls (12) further define a cutting aperture (122), and the cutting aperture (122) is located between two adjacent divider plates (13).

It should be noted that the cutting aperture (122) can be provided at any position as needed for actual cutting, for example, the cutting aperture (122) is located in a middle portion of the side wall (12). In some embodiments, only one side wall defines the cutting aperture.

Embodiments of the present application, by providing corresponding cutting apertures (122) in the two side walls (12), with the cutting aperture (122) disposed between two adjacent divider plates (13), enable a cutting tool to cut the first type of food or the second type of food through the cutting aperture (122) when the first type of food or the second type of food is placed in the corresponding position.

Further, in an optional embodiment, the unremoved divider plate (13) and the removable side panel (14) are respectively located on opposite sides of the cutting aperture (122).

Embodiments of the present application, by disposing the unremoved divider plate (13) and the removable side panel (14) on opposite sides of the cutting aperture (122), facilitate precise positioning and sectioning of the first type of food, such as a bagel, through the cutting aperture (122).

Continuing as shown in FIGS. 1 to 3, in an optional embodiment, a fixed side panel (15) is further provided on a side of the base (11) opposite the removable side panel (14).

Embodiments of the present application, by providing the fixed side panel (15), facilitate cooperation with the removable side panel (14) and the side walls (12) to form a protective wall.

Continuing as shown in FIGS. 1 to 3, in an optional embodiment, a first recess (131) is defined on a side of the divider plate (13) facing away from the base (11), and the first recess (131) is configured to allow a finger to extend through the first recess (131) into a cut first-type food and remove it.

In an optional embodiment, the removable side panel (14) and the fixed side panel (15) respectively define a second recess (142) on a side facing away from the base (11), and the second recess (142) is configured to allow a finger to extend through the second recess (142) into a cut first-type food and remove it when the removable side panel (14) and/or the fixed side panel (15) are located close to the divider plate (13).

In embodiments of the present application, since the overall food cutting apparatus (10) is typically compact in size, by designing the second recess (142), when the removable side panel (14) and the fixed side panel (15) are close to the divider plate (13), it ensures that after cutting the first type of food, such as a bagel, a finger can extend through the second recess (142) into the bagel and remove the cut bagel.

Continuing as shown in FIGS. 1 and 2, in an optional embodiment, an outer edge of the side wall (12) defines a second slot (123) along a height direction thereof; a side edge of the removable side panel (14) (for example, left and right sides of the removable side panel (14) as shown in FIG. 2) is provided with a first protrusion (144) adapted to the second slot (123); and the removable side panel (14) is inserted into the second slot (123) via the first protrusion (144) to form a detachable connection between the removable side panel (14) and the side wall (12).

It should be noted that the second slot (123) can be symmetrically provided on both side walls (12), or provided only on one of the side walls (12), both of which fall within the scope of protection of the present application.

Embodiments of the present application, by forming the second slot (123) along the height direction on the outer edge of the side wall (12) and forming the first protrusion (144) adapted to the second slot (123) on the side edge of the removable side panel (14), allow the removable side panel (14) to be inserted into the second slot (123) from a top face of the side wall (12), thereby completing quick installation of the removable side panel (14).

Further, in an optional embodiment, an abutment portion (141) is defined on an outer side of the first protrusion (144) of the removable side panel (14), and the abutment portion (141) is configured to abut and adapt to an end face of an outer wall of the second slot (123).

Embodiments of the present application, by forming the abutment portion (141) adapted to abut the end face of the outer wall of the second slot (123) on the outer side of the first protrusion (144) of the removable side panel (14), enable effective and secure cooperation with the side wall (12) during quick installation of the removable side panel (14), resulting in a more aesthetically pleasing appearance and aiding in protecting the internal structure of the food cutting apparatus (10).

It should be noted that, in addition to the detachable structure described in the above embodiments, the connection structure for detachably connecting the removable side panel (14) to the side wall (12) or the base (11) in embodiments of the present application can adopt various existing or future-developed detachable connection structures as needed, such as snap-fit connection structures or hinge connection structures, all of which fall within the scope of protection of the present application.

Continuing as shown in FIGS. 1 to 4, FIG. 4 is an exploded structural schematic view of the food cutting apparatus (10) provided by an embodiment of the present application.

In an optional embodiment, a side of the base (11) adjacent the removable side panel (14) defines an installation side; a lower end of the removable side panel (14) is provided with a first connection structure; the installation side of the base (11) is provided with a second connection structure configured to releasably engage and adapt to the first connection structure; and after detaching the removable side panel (14) from the second slot (123), the first connection structure is connected with the second connection structure such that the removable side panel (14) is coplanar with the base (11) and extends in a direction away from the installation side.

It should be noted that the term "coplanar" as used above refers to the bottom face of the removable side panel (14) being parallel to the bottom face of the base (11), rather than strictly identical in thickness.

As can be understood from FIG. 1, when the removable side panel (14) is connected to the second slot (123), it is in a vertical state, with the base (11) in a horizontal state; as shown in FIG. 2, when the removable side panel (14) is connected to the base (11), the removable side panel (14) is also in a horizontal state, which provides a clean placement position for the second type of food (for example, bread) during cutting, avoiding direct contact between the bread and the countertop, since bread is typically elongated and the length of the base (11) in the second cutting space for the second type of food is considerably shorter than the length of the bread, such that if the base (11) is not connected to the removable side panel (14) and coplanar therewith, a portion of the bread may contact the countertop directly.

Figure 4:
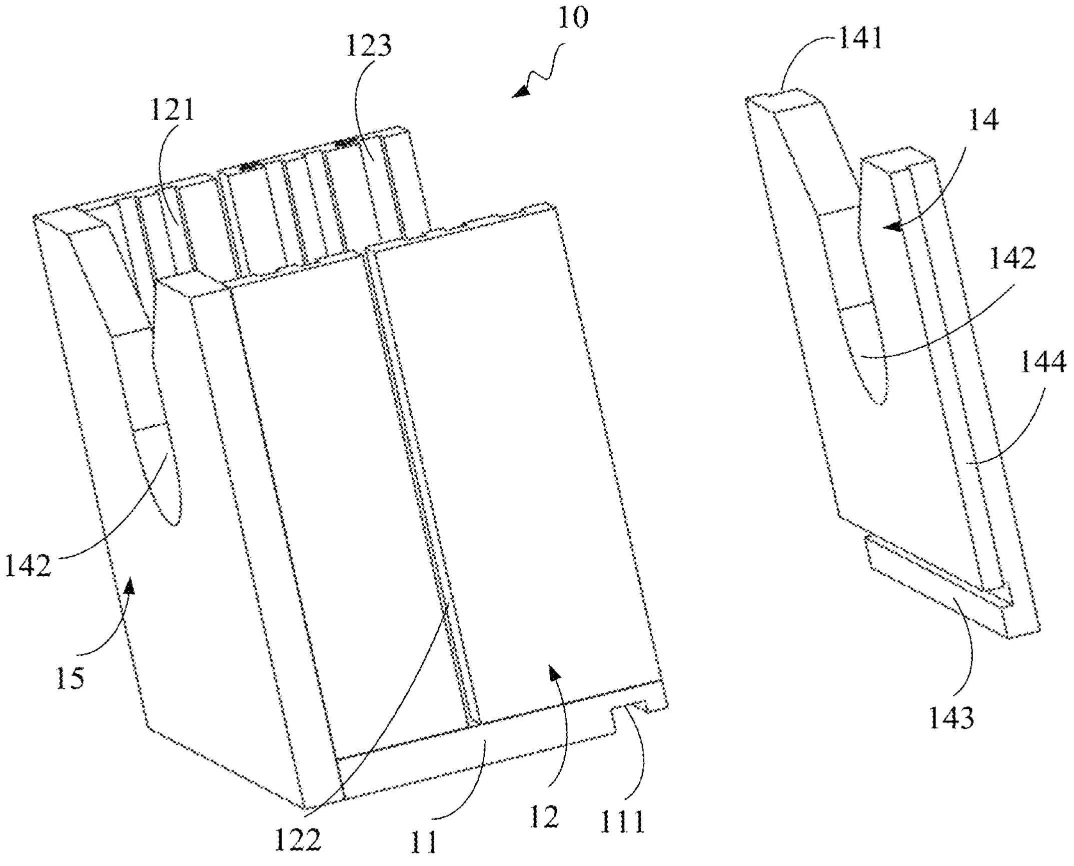
FIG. 4 is an exploded structural schematic view of the food cutting apparatus provided by an embodiment of the present application.

As shown in FIG. 4, further, in one embodiment, the first connection structure is a second protrusion (143), and the second connection structure defines a groove (111); in addition, the first connection structure can be designed as a groove and the second connection structure as a second protrusion as needed, both of which fall within the scope of protection of the present application.

Further, in an optional embodiment, the second connection structure is located on a lower surface of the installation side of the base (11).

Embodiments of the present application, by disposing the second connection structure on the lower surface of the installation side of the base (11), form a flat plane on the upper surface of the base (11) after the removable side panel (14) is installed to the base (11), thereby facilitating placement of the second type of food thereon or serving other purposes such as a food cutting board when the food cutting apparatus (10) is idle.

Figure 5:
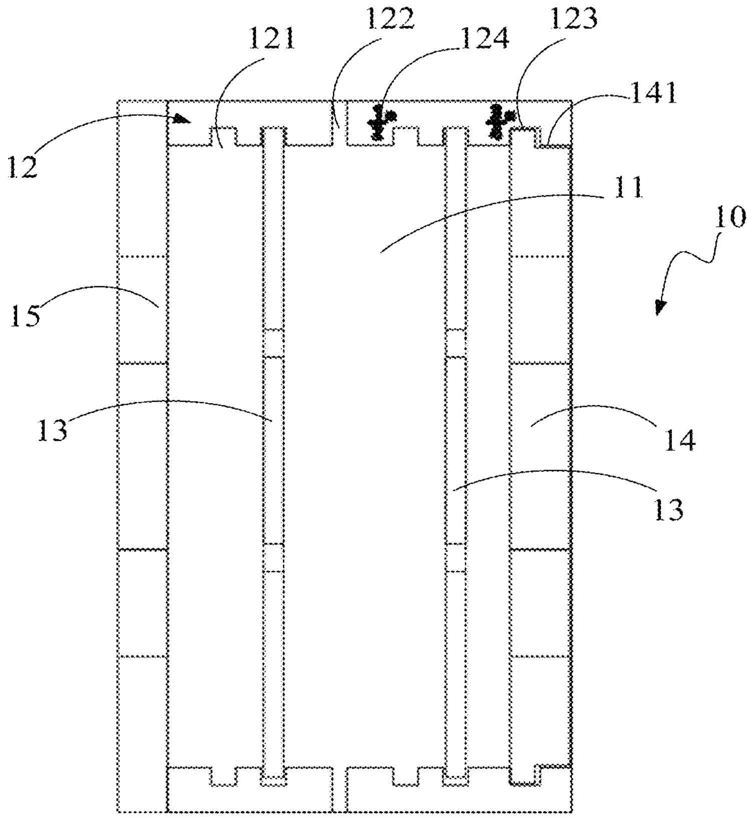
FIG. 5 is a top view of the food cutting apparatus provided in FIG. 1.

As shown in FIGS. 1 and 5, FIG. 5 is atop view of the food cutting apparatus (10) provided in FIG. 1.

In an optional embodiment, the first slots (121) further define corresponding graduation markings (124).

Specifically, the graduation markings (124) can be provided at any convenient position for observation as needed, for example, on the top face of the side wall (12) corresponding to the first slots (121). The graduation markings (124) can be indicated based on the distance between the slots and the cutting aperture (122), for controlling the thickness of slices when cutting the second type of food.

In an optional embodiment, a surface of the base (11) is provided with a non-slip pad (not shown in the figures), and by providing the non-slip pad, the possibility of slippage of food placed on the base (11) during the cutting process is reduced.

Specifically, the non-slip pad can adopt any pad that provides a non-slip function as needed, for example, a silicone pad.

Obviously, the embodiments described above are merely some embodiments of the present application, rather than all embodiments thereof, the drawings provide preferred embodiments of the present application, but do not limit the patent scope of the present application. The present application can be implemented in many different forms; on the contrary, the purpose of providing these embodiments is to make the disclosure of the present application more thorough and comprehensive. Although the present application has been described in detail with reference to the foregoing embodiments, for those of ordinary skill in the art, modifications can still be made to the technical solutions recited in the foregoing specific embodiments, or equivalent substitutions can be made for some of the technical features therein. Any equivalent structures made using the content of the specification and drawings of the present application, whether directly or indirectly applied to other related technical fields, are likewise within the scope of protection of the present application.

The invention claimed is:

1. A food cutting apparatus, comprising: a base; two side walls connected to the base and disposed opposite each other; at least two divider plates detachably connected to at least one of the side walls, wherein adjacent ones of the divider plates together with the side wall define a first cutting space for a first type of food; and a removable side panel detachably connected to the side wall or the base, wherein at least the two divider plates are disposed on the same side of the removable side panel; and wherein, upon removal of the removable side panel and at least one of the divider plates, an unremoved divider plate together with the side wall defines a second cutting space for a second type of food; wherein the two side walls are respectively provided, along a height direction thereof, with a plurality of first slots, and opposite sides of each divider plate are respectively inserted into the first slots of the two side walls to form a detachable connection between the divider plate and the side walls; wherein at least one side wall further defines a cutting aperture, and the cutting aperture is located between two adjacent divider plates; wherein an unremoved one of the divider plates and the removable side panel are located on opposite sides of the cutting aperture; and wherein at least two of the first slots further bear graduation markings, the graduation markings being indicated in correspondence with distances between the respective first slots and the cutting aperture.

2. A food cutting apparatus, comprising: a base; two side walls connected to the base and disposed opposite each other; at least two divider plates detachably connected to at least one of the side walls, wherein adjacent ones of the divider plates together with the side wall define a first cutting space for a first type of food; and a removable side panel detachably connected to the side wall or the base, wherein at least the two divider plates are disposed on the same side of the removable side panel; and wherein, upon removal of the removable side panel and at least one of the divider plates, an unremoved divider plate together with the side wall defines a second cutting space for a second type of food: wherein a first recess is defined on a side of the divider plate facing away from the base and is configured to allow a finger to reach into a cut first-type food and remove it.

3. The food cutting apparatus of claim 2, further comprising a fixed side panel provided on a side of the base opposite the removable side panel, wherein the removable side panel and/or the fixed side panel define, on a side facing away from the base, a second recess configured to allow a finger to reach into the cut first-type food and remove it when the removable side panel and/or the fixed side panel are located close to the divider plate.

4. A food cutting apparatus, comprising: a base: two side walls connected to the base and disposed opposite each other: at least two divider plates detachably connected to at least one of the side walls, wherein adjacent ones of the divider plates together with the side wall define a first cutting space for a first type of food; and a removable side panel detachably connected to the side wall or the base, wherein at least the two divider plates are disposed on the same side of the removable side panel; and wherein, upon removal of the removable side panel and at least one of the divider plates, an unremoved divider plate together with the side wall defines a second cutting space for a second type of food: wherein an outer edge of at least one side wall defines, along the height direction thereof, a second slot, a side edge of the removable side panel includes a first protrusion adapted to the second slot, and the removable side panel is inserted into the second slot via the first protrusion to form a detachable connection between the removable side panel and the side wall.

5. The food cutting apparatus of claim 4, wherein the removable side panel further defines, on an outer side of the first protrusion, an abutment portion configured to abut an end face of an outer wall of the second slot.

6. The food cutting apparatus of claim 4, wherein a side of the base adjacent the removable side panel is an installation side, a lower end of the removable side panel is provided with a first connection structure, the installation side of the base is provided with a second connection structure configured to releasably engage the first connection structure, and, after detaching the removable side panel from the second slot, the first connection structure is connected with the second connection structure such that the removable side panel is coplanar with the base and extends in a direction away from the installation side.

* * * * *